UNITED STATES PATENT OFFICE.

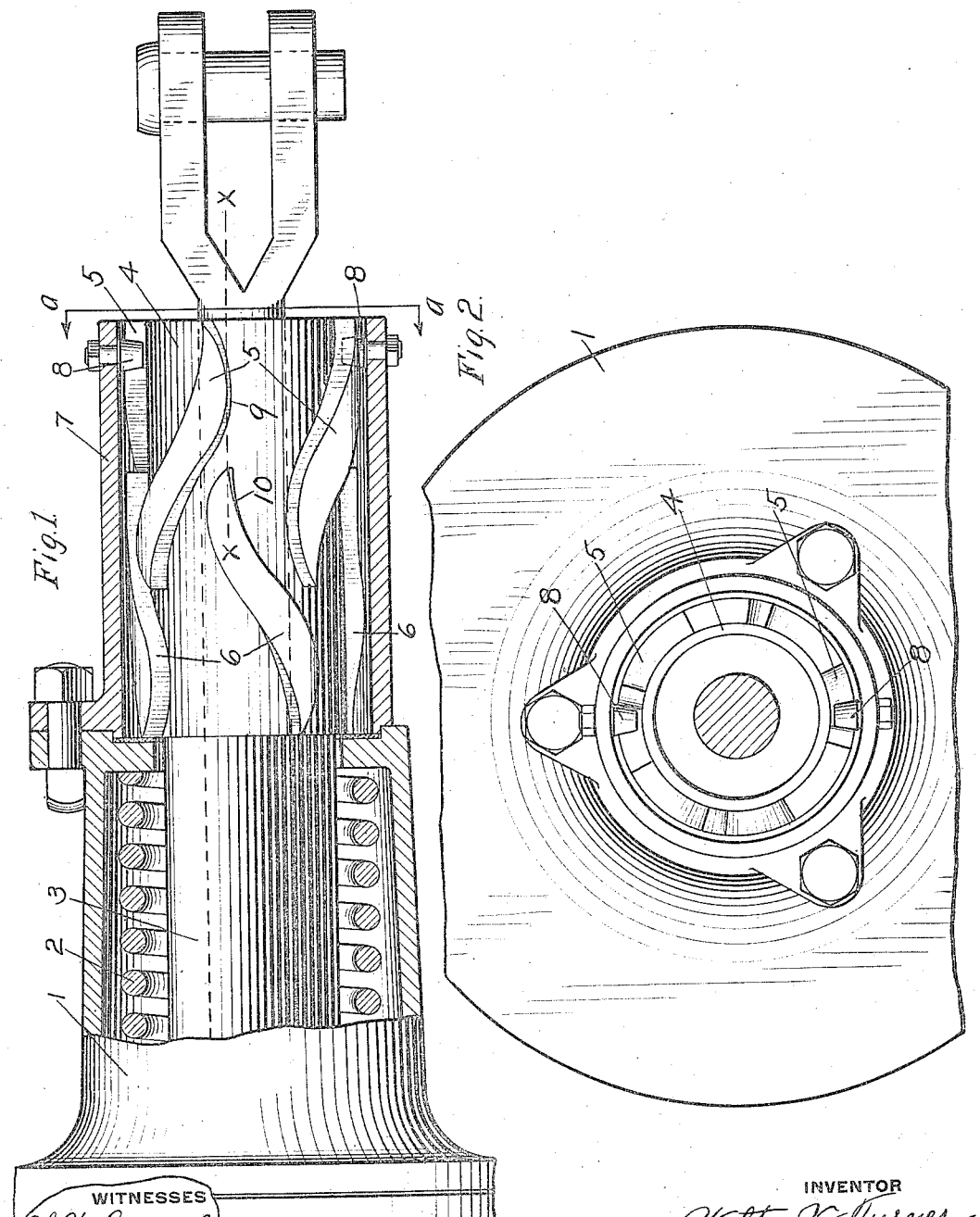

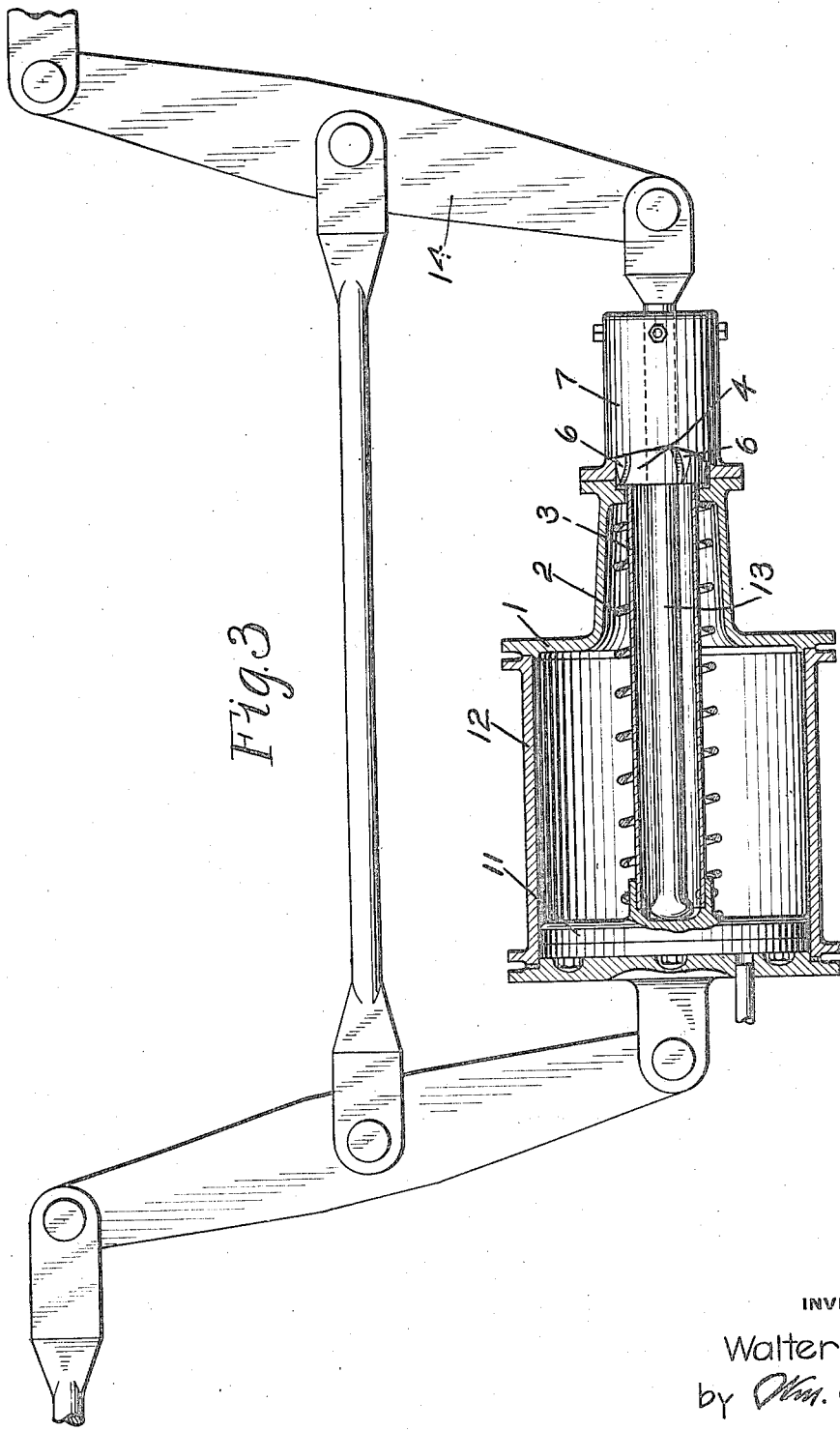

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

PISTON-ROTATOR.

1,228,496.

Specification of Letters Patent.

Patented June 5, 1917.

Application filed October 3, 1914. Serial No. 864,872.

*To all whom it may concern:*

Be it known that I, WALTER V. TURNER, a citizen of the United States, residing at Edgewood, in the county of Allegheny and State of Pennsylvania, have invented new and useful Improvements in Piston-Rotators, of which the following is a specification.

This invention relates to fluid pressure brakes in which a fluid operated piston is employed for effecting an application of the brakes.

In the movement of the usual brake cylinder piston in the brake cylinder, the piston and the packing leather are liable to become worn unevenly by reason of the fact that most of the weight of the piston parts bears against the lowermost portion of the cylinder, so that the particular portion of the packing which engages at the bottom of the brake cylinder receives more wear than the rest of the packing.

The principal object of my invention is to provide means for securing a more uniform wear of the brake cylinder piston and packing leather and for this purpose I provide means operating in the movement of the brake cylinder piston upon applying and releasing the brakes, for rotating the brake cylinder piston on its axis.

In the accompanying drawing; Figure 1 is a sectional view of a portion of a brake cylinder, with my improvement applied thereto, Fig. 2 an enlarged section on the line *a—a* of Fig. 1; and Fig. 3 a view showing a complete brake cylinder with my improvement applied in connection with the usual brake rigging.

As shown in the drawing, the reference numeral 1 indicates the non-pressure head of a brake cylinder and contains the usual release spring 2 surrounding the hollow push rod 3.

According to my invention, there is secured to the outer end of the push rod 3, a cam cylinder 4 upon the surface of which are arranged a series of cams 5 at the forward end and a similar series of cams 6 at the rearward end.

The cam cylinder 4 is inclosed within a casing 7 which is secured to the outer end of the non-pressure head 1 and said casing carries preferably a pair of oppositely arranged rollers 8 adapted to engage the lateral faces of the cams 5 and 6.

The lateral engaging faces of the cams are in the form of reverse curves, the axes of the cams being inclined with respect to the longitudinal axis of the cam cylinder.

In Fig. 3 of the drawings, the identical construction of Fig. 1 is shown, but the usual brake cylinder and brake rigging connections are more completely illustrated.

As in the standard brake equipment, the hollow push rod 3 is secured to brake cylinder piston 11 contained in brake cylinder 12 and within the push rod is the usual solid rod 13 which is connected at the outer end to the usual brake lever 14 and bears against the piston 11 at the inner end.

In operation, assume that a roller 8 is positioned adjacent to the lateral face 9 of a cam 5 and that the brakes are being applied. The push rod 3 will then move outwardly and cause the roller 8 to engage the cam surface 9. The cam cylinder is thereby rotated until the roller 8 leaves the lateral surface at the point of longitudinal tangency.

Further outward movement of the push rod does not cause rotation until the roller 8 engages the toe of an inner cam 6, the extreme point of which is substantially in the longitudinal tangent of the forward cam surface 9, as shown by the dotted line *x—x*. The rotation of the cam cylinder 4 is now continued by the engagement of roller 8 with cam face 10 and when the push rod has moved out to the brake applied position, the roller 8 will have passed the longitudinal tangent of the cam face 10. It will be evident that a partial rotation of the push rod and the brake cylinder piston is thus effected in applying the brakes. In releasing the brakes, the return movement of the push rod brings the roller 8 into engagement with the surface 9 of the succeeding forward cam 5, since the rear toe of this cam is in alinement with the longitudinal tangent of the corresponding rear cam face 10. A further rotation of the cam cylinder and brake cylinder piston will now be effected by engagement of the roller 8 with the cam surface 9 and it will be noted that the rotation is in the same direction as when the brakes are applied.

Upon movement of the parts to full release position, the roller 8 will stand in line with the longitudinal tangent of the cam face 9, so that upon again applying the brakes, the roller 8 will be in position to engage the cam face 10 and continue the rotation of the cam cylinder and the brake cylinder piston in the same direction of rotation.

By thus continually rotating the brake cylinder piston as the brakes are applied and released, a more uniform wear of the piston and leather packing is brought about.

In the above description of operation, only one roller, 8, is referred to, but in order to equalize the strains, I prefer to employ two opposite rollers, as shown in the drawing, the cams being so spaced that each roller engages an adjacent cam surface at the same time and in the same relative manner, as will be understood.

As will be evident from Fig. 3, the solid rod 13 being connected to the brake rigging does not rotate with the brake cylinder piston.

Having thus described my invention, what I claim as new and desire to secure by Letters Patent, is:

1. In a fluid pressure brake, the combination with a brake cylinder, a piston therein, and a non-rotating brake connection adapted to be operated by said piston, of means operated by the reciprocative movement of the brake cylinder piston in either direction for imparting to the piston a progressive rotative movement in one direction to thereby equalize the wear on the piston packing.

2. In a fluid pressure brake, the combination with a brake cylinder containing a brake cylinder piston and a non-rotating brake connection adapted to be operated by said piston, of means for rotating the piston in one direction in applying and in the same direction in releasing the brakes to thereby equalize the wear on the piston packing.

3. In a fluid pressure brake, the combination with a brake cylinder piston and rod and a non-rotative brake connection adapted to be operated by said piston, of means carried by said rod and operated by the reciprocation of the piston for progressively rotating said rod in one direction only and thereby the brake cylinder piston to thereby equalize the wear on the piston packing.

4. In a fluid pressure brake, the combination with a non-rotating brake connection, a brake cylinder piston and rod for operating said connection, of cams carried by said rod and a stationary roller adapted to engage said cams upon movement of the piston rod in either direction to thereby effect the rotation of said rod and the brake cylinder piston in the same direction of rotation.

5. In a fluid pressure brake, the combination with a brake cylinder piston rod, of a series of front and rear cams having cam surfaces inclined to the line of movement, a stationary roller for engaging said surfaces to impart rotary movement to the piston rod by first engaging a cam surface of one series and then of the other series.

6. In a fluid pressure brake, the combination with a brake cylinder piston rod, of a series of front and rear cams having cam surfaces inclined to the line of movement, a stationary roller for alternately engaging a cam surface of a front and a rear cam to impart rotary movement to the piston rod.

7. In a fluid pressure brake, the combination with a brake cylinder piston rod, of a series of front and rear cams having cam surfaces inclined to the line of movement, a stationary roller for alternately engaging a cam surface of a front and a rear cam to impart rotary movement to the piston rod continually in the same direction.

8. In a fluid pressure brake, the combination with a brake cylinder piston rod, of a series of front and rear cams having cam surfaces inclined to the line of movement, a stationary roller for engaging a cam surface of a rear cam upon movement of the piston rod in one direction and a cam surface of a front cam upon movement of the piston rod in the opposite direction to thereby effect the rotation of the piston rod and the brake cylinder piston.

In testimony whereof I have hereunto set my hand.

WALTER V. TURNER.

Witnesses:
A. M. CLEMENTS,
S. W. KEEFER.